United States Patent [19]
Takahashi et al.

[11] Patent Number: 6,068,094
[45] Date of Patent: May 30, 2000

[54] SINTERED FRICTION MATERIAL

[75] Inventors: Kyo Takahashi; Masahiro Yoshida; Yoshitoshi Hagiwara, all of Wako; Katsuyoshi Kondoh, Itami; Yoshishige Takano, Itami; Yukinori Yamashita, Itami, all of Japan

[73] Assignees: Honda Giken Kogyo Kabushiki Kaisha, Tokyo; Sumitomo Electric Industries Ltd., Osaka, both of Japan

[21] Appl. No.: 08/820,026

[22] Filed: Mar. 19, 1997

[30] Foreign Application Priority Data

Mar. 29, 1996 [JP] Japan ................................ 8-099512

[51] Int. Cl.[7] .................................................. F16D 69/00
[52] U.S. Cl. ...................................................... 188/251 M
[58] Field of Search .................. 188/251 M, 218 XL; 428/323; 191/107 M

[56] References Cited

U.S. PATENT DOCUMENTS

| | | | |
|---|---|---|---|
| 4,121,925 | 10/1978 | Chapman et al. | 75/130 R |
| 4,576,872 | 3/1986 | Ward | 428/550 |
| 5,323,883 | 6/1994 | Mibe et al. | 188/251 R |
| 5,358,684 | 10/1994 | Valentin | 419/10 |
| 5,518,519 | 5/1996 | Kondoh et al. | 75/231 |
| 5,620,791 | 4/1997 | Dwivedi et al. | 428/323 |
| 5,824,923 | 10/1998 | Kondoh et al. | 75/247 |

FOREIGN PATENT DOCUMENTS 7-102335   4/1995   Japan .

*Primary Examiner*—Robert J. Oberleitner
*Assistant Examiner*—Melanie Talavera
*Attorney, Agent, or Firm*—Nikaido Marmelstein Murray & Oram, LLP.

[57] ABSTRACT

A copper series sintered friction material is provided including a foundation constituted by copper alloy powder and containing hard phases and solid lubricant components dispersed uniformly, and exhibits a friction coefficient of 0.3 or more stably without seizure when the sintered friction material frictionally slides against titanium or a titanium alloy in the atmosphere, the foundation containing at least one additive element selected from Zn, Ni, Al, Fe, and Mo.

15 Claims, 2 Drawing Sheets

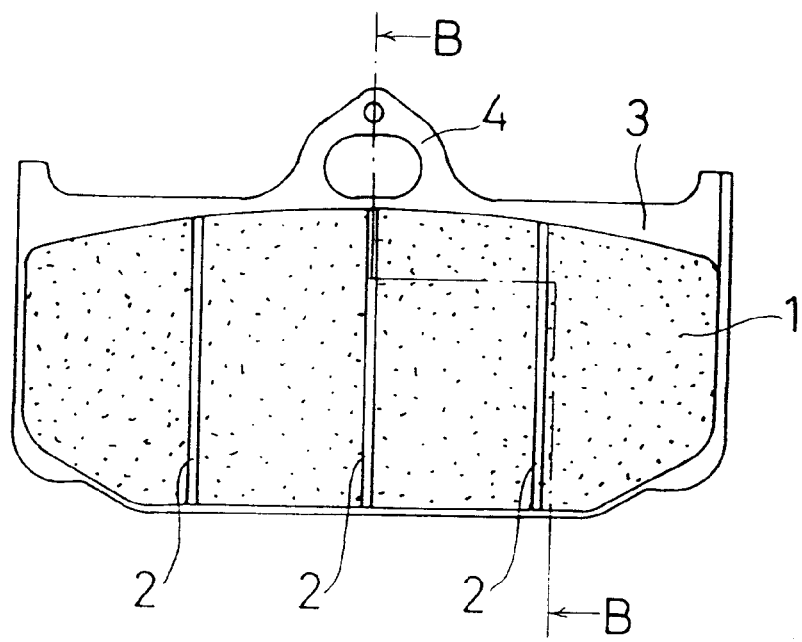
F I G. 1
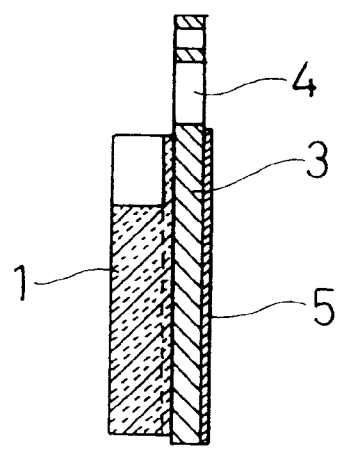
F I G. 2

SINTERED FRICTION MATERIAL

BACKGROUND OF THE INVENTION

The present invention relates to a sintered friction material containing copper alloy powder and a hard phase. This sintered friction material is suitable for use as a brake friction pad, particularly for a friction pad for a brake rotor made of titanium or titanium alloy.

Hitherto, copper series sintered alloy sliding members are known, and as one of them there has been proposed a copper series sintered alloy sliding member having a foundation of Sn—Cu series copper alloy in which the hard phases consist of at least one kind of iron series intermetallic compound selected from the group of FeMo, FeCr, FeTi, FeW, FeB dispersed uniformly (Japanese Laid-Open Patent Publication No. Hei 7-102335, for example). Such a customary copper alloy sintered pad for brakes has been used as a friction pad for a rotor made of cast iron, iron or stainless steel.

The brake pad for a rotor of cast iron, iron or stainless steel cannot be used for an untreated surface of a disk rotor of titanium or titanium alloy, because heat-resistance and abrasion-resistance are insufficient.

SUMMARY OF THE INVENTION

According to the present invention, there is provided a copper series sintered friction material which has a foundation constituted by copper alloy powder and containing hard phases and solid lubricant components dispersed uniformly therein, and exhibiting a friction coefficient of 0.3 or more stably without seizure when it frictionally slides against titanium or titanium alloy in the atmosphere.

In the copper series sintered friction material, a part or all of the hard phases may be dispersed uniformly in former particles of copper alloy powder constituting the foundation.

The hard phase may be an iron series intermetallic compound and the solid lubricant component may be graphite and/or $MoS_2$. Further, any one of Sn, Zn, Ni, Al, Fe, Mo may be contained in the foundation as additive element. Moreover, a twice shaping and twice sintering process or a forging process may be carried out in order to improve strength.

The sintered friction material of the present invention is suitable for use as a friction pad of a brake rotor made of titanium or titanium alloy.

The sintered friction material of the present invention can exhibit a friction coefficient of 0.3 or more stably, namely without causing seizure, when it frictionally slides against titanium or titanium alloy in the atmosphere.

A part or all of the hard phases are dispersed uniformly in former particles of copper alloy powder constituting the foundation by mechanical grinding, granulating, alloying process (mechanical alloying process) of the powder.

By carrying out the twice shaping and twice sintering process or the forging process to improve strength, the sintered friction material having excellent high-temperature strength, heat-resistance, abrasion-resistance, a $\mu$ characteristic and the like is obtainable. And this sintered friction material is suitable for use as a brake friction pad, particularly as a friction pad for a brake rotor made of titanium or titanium alloy.

BRIEF DESCRIPTION OF THE DRAWINGS

FIG. 1 is a plan view showing a brake friction pad according to a preferred embodiment of the present invention;

FIG. 2 is a sectional view showing the brake friction pad;

DETAILED DESCRIPTION OF THE PREFERRED EMBODIMENT

Figure 3:
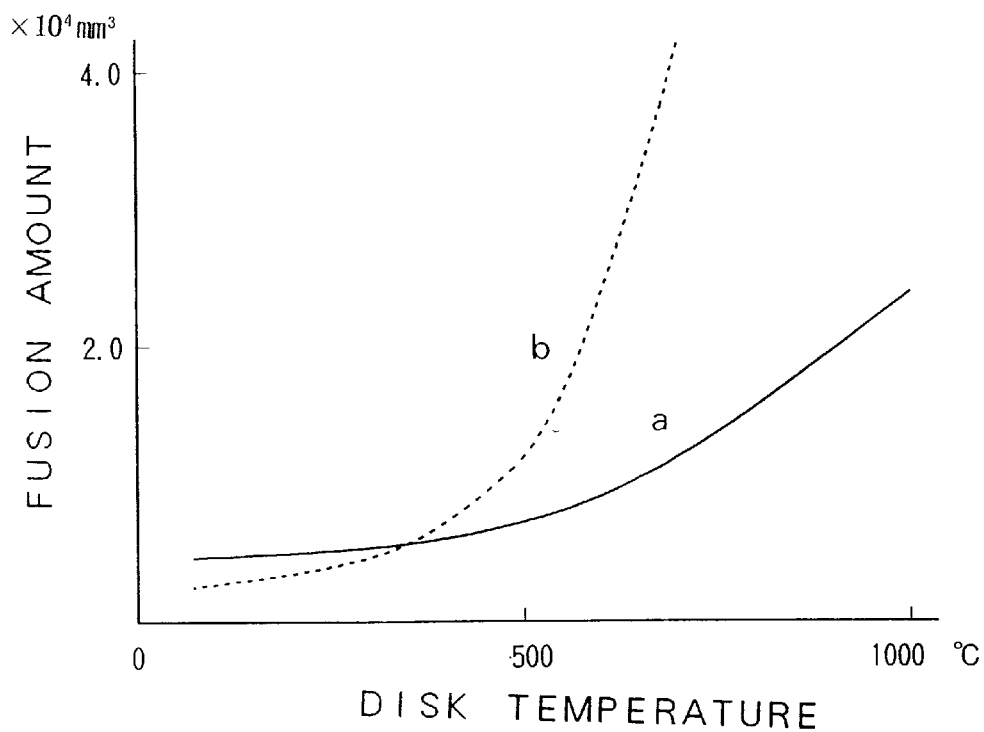
FIG. 3 is a graph showing disk temperature—pad fusion amount characteristic.

In the sintered friction material of the invention containing a copper alloy powder and a hard phase, the copper alloy powder, which is the foundation, contains at least one kind of element selected from Sn, Zn, Ni, Al, Fe, Mo. The foundation strengthens the sintered body of Cu containing Sn, Zn, Ni, Al, Fe, Mo. Preferable contents of these elements are Sn: 5–15 wt. %, Zn: 5–30 wt. %, Ni: 5–30 wt. %, Al: 1–3 wt. %, Fe: 1–5 wt. %, Mo: 1–5 wt. %. Since the copper alloy powder having undergone mechanical alloying process is used, heat-resistance is improved and fade is prevented usefully.

As for the hard phase, iron series intermetallic compound is preferable and, for example, FeMo, FeCr, FeW, FeB are effective. Particle size of the raw material powder is not limited because grinding by the mechanical alloying process is performed. Further, the sintered friction material contains solid lubricant, for example, graphite, $MoS_2$ etc. In some cases, graphite, carbon powder or ore powder is added as a stuffing. The graphite is effective for preventing build-up.

Strengthening of the foundation by the copper alloy powder having undergone the mechanical alloying process (mechanical grinding, granulating, alloying process) is carried out as follows, for example. Copper alloy powder containing at least one kind of Sn, Zn, Ni, Al, Fe, Mo as foundation, and the above-mentioned iron series intermetallic compound as hard phase are put together with balls into a receptacle with surroundings cooled by water and filled with a gas such as $N_2$, Ar to be mixed and ground mechanically. The copper alloy powders are beaten out and torn by the balls and the iron series intermetallic compounds of the hard phase ground finely are taken up by the copper alloy powders and dispersed uniformly therein.

The foundation of the copper alloy powder containing at least one kind of Sn, Zn, Ni, Al, Fe, Mo may be made by mechanical alloying mixture of Cu powder and at least one kind of Sn powder, Zn powder, Ni powder, Al powder, Fe powder, Mo powder. Resulting grain size distribution is not particularly specified but decided in view of flowing nature of the powders. For example, grain sizes of 60–80 $\mu$m are used.

The aforementioned twice shaping and twice sintering process includes steps arranged in order of the first shaping→the first sintering→the second shaping (compressing)→the second sintering, and the aforementioned forging process includes steps of shaping→sintering→heating→forging.

The shaping and forging are carried out using a hydraulic press, a mechanical press or the like, and the sintering is carried out in an atmosphere of a reducing gas, an inert gas or a vacuum.

The sintered friction material according to the present invention is suitable for a brake friction pad, particularly for a friction pad for a brake rotor made of titanium or titanium alloy. Therefore, the brake rotor made of titanium or titanium alloy will be described.

The brake rotor made of titanium or titanium alloy is of $\alpha+\beta$ phase having equiaxed crystal grain to reduce deformation owing to thermal stress and sizes of coarsened crystal grains thereof are 300 μm–4 mm. It is produced by heat treating on β transas and hardening the titanium alloy to form the equiaxed crystal grains.

As α+β type titanium alloy for the brake rotor, for example, Ti—6Al4V, Ti—6Al6V2Sn, Ti—6Al2Sn4Zr6Mo and the like are known. In the brake rotor made of the titanium alloy, the metallurgic structure of the rotor body is controlled and crystal grains are equiaxed so that a customary coating treatment is unnecessary. While heat conductivity of titanium is low compared with that of a customary iron series raw material, in the brake rotor of titanium, strain owing to thermal stress can be reduced by the α+β phase having the equiaxed crystal grains, thus a suitable brake rotor of titanium of light weight and improved endurance and having no problem of rust can be obtained.

More concretely, Ti—6Al4V, which is a α+β type titanium alloy, is heat treated 2 hours at 1050° C. on β transas and quenched. A crystal structure hard to be distorted at a high temperature is obtained by remaining β phase of equiaxed crystal produced at the quenching. The crystal grains are coarsened to 300 μm–4 mm to improve greatly deformation toughness against thermal stress.

The sintered friction material of the present invention is suitable for a brake friction pad. FIGS. 1 and 2 show a sintered pad of copper alloy according to the sintered friction material of the present invention.

FIG. 1 is a plan view of a friction pad for a disk plate and FIG. 2 is a B—B section of FIG. 1. As shown in FIGS. 1 and 2, a friction pad 1 of a copper alloy is lined and joined onto a holder plate 3 of metal. The sintered friction pad 1 has several recessed grooves 2 shaped extending about radially of the brake disk. The grooves 2 are formed only on the friction pad 1 which has a continuous surface on the side of the holder plate 3 to be lined and joined to the plate 3. The holder plate has an attaching part 4 and a ceramic coating 5.

In the sintered friction pad of copper alloy which is a preferred embodiment of the present invention, the matrix is strengthened by Cu powder processed by MA (mechanical alloying) and abrasion-resistance and μ characteristics are ensured by the hard phase composed of iron series intermetallic compounds.

To the Cu/MA is added at least one kind of Ni, Sn, Zn, Fe, Mo, Al as an alloy component and graphite, $MoS_2$ or the like as a solid lubricant.

As typical compositions of the sintered friction pad, there are Cu/MA—1 wt. % Al—7 wt. % $MoS_2$, Cu/MA—20 wt. % Ni AlFe/MA—1 wt. % Al—5 wt. % graphite—2 wt. % Fiber and the like. Cu/MA means a copper alloy powder obtained by mechanical alloying a powder having composition of Cu—9 wt. % Sn—25 wt. % FeMo. The copper alloy powder has a structure in which FeMo powder as hard phase is ground to an average particle size of about 10 μm and dispersed uniformly within a powder foundation of Cu—9% Sn.

As for the Fiber, a ceramic series fiber is used.

If the strength of the sintered body is insufficient, there is a possibility that fade phenomenon occurs on braking, therefore, the strength of the sintered body may be further improved by the twice shaping and twice sintering process or the forging process by which breaking strength of the body is improved about 1.5–2.0 times.

Figure 4:
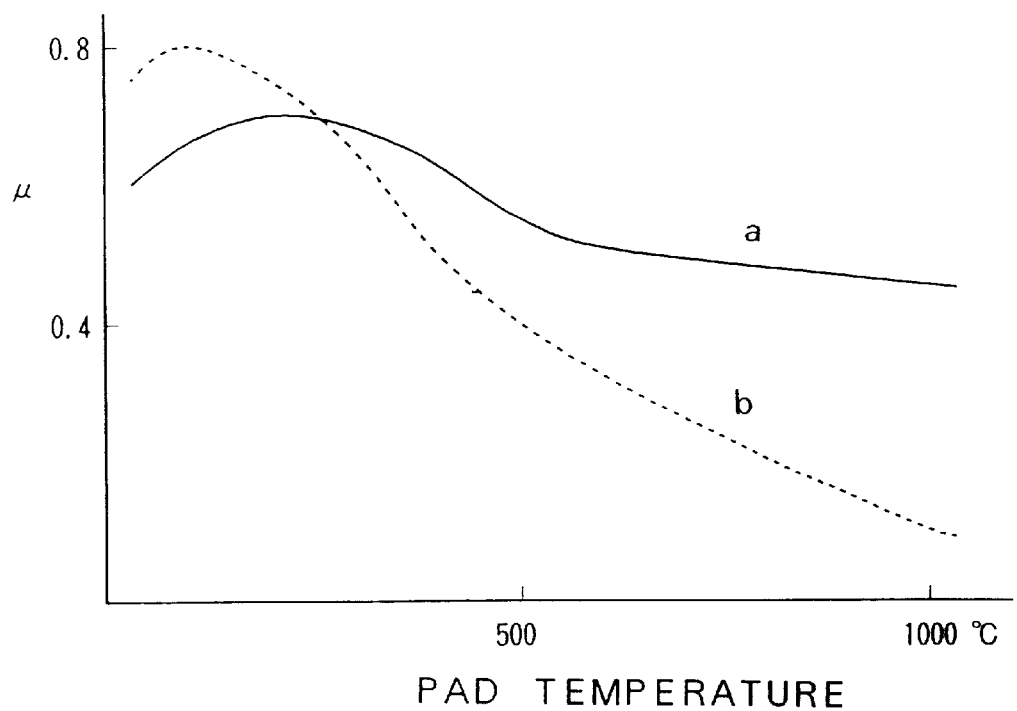
FIG. 4 is a graph showing pad temperature—$\mu$ characteristic.

FIGS. 3 and 4 show abrasion-resistance and μ characteristic of pads.

In FIG. 3 showing disk temperature—pad fusion amount characteristic, the horizontal axis shows the disk temperature and the vertical axis shows the fusion amount ($\times 10^4 mm^3$). Fusion Characteristics resulting from a combination of the friction pad of the present invention and a disk (made of titanium alloy) is shown by the solid line a, and fusion characteristics resulting from a combination of a customary pad (Cu series pad for example) and the disk is shown by the dotted line b.

In the case of the customary pad, the fusion amount increases hastily at a temperature below 500° C. On the one hand, in the case of the friction pad of the sintered friction material of the invention, the fusion amount is almost not changed at 500° C. and barely reaches $2.0 \times 10^4$ $mm^3$ at 1000° C. It is clear that the pad of the invention has excellent heat-resistance and abrasion-resistance.

In FIG. 4 showing pad temperature—μ characteristic, the horizontal axis shows the pad temperature and the vertical axis shows μ (friction coefficient). In case of the customary pad (dotted line b), μ is high at a temperature lower than 350° C. but decreases with increasing temperature. On the one hand, in the case of the pad of the invention, μ is not changed even if temperature rises to exhibit excellent heat-resistance and abrasion-resistance.

The sintered friction material of the present invention has excellent high-temperature strength, heat-resistance, abrasion-resistance and μ characteristics and can ensure a stable high friction coefficient. The sintered pad of copper alloy utilizing this sintered friction material can ensure excellent high-temperature strength, heat-resistance, abrasion-resistance, μ-characteristic and a stable high friction coefficient and does not seize on another material. Therefore, the sintered friction material of the invention is particularly suitable to a pad for a brake rotor made of titanium or titanium alloy.

What is claimed is:

1. A copper series sintered friction material comprising a foundation constituted by copper alloy powder and containing hard phases and solid lubricant components dispersed uniformly, and exhibits a friction coefficient of 0.3 or more stably without seizure when said sintered friction material frictionally slides against titanium or a titanium alloy in the atmosphere, said foundation containing at least one additive element selected from Zn, Ni, Al, Fe and Mo.

2. A copper series sintered friction material as claimed in claim 1, wherein at least a part of said hard phases is dispersed uniformly in former particles of said copper alloy powder constituting said foundation.

3. A copper series sintered friction material as claimed in claims 1 or 2, wherein said hard phase is an iron series intermetallic compound and said solid lubricant component is graphite and/or $MoS_2$.

4. A brake pad made of said copper series sintered friction material as claimed in claims 1 or 2, wherein said brake pad exhibits a friction coefficient of 0.3 or more stably without causing fade phenomenon when it is used in combination with a disk rotor of titanium or titanium alloy.

5. A friction pad having said sintered friction material as claimed in claims 1 or 2 lined and joined on a holder plate.

6. A friction pad as claimed in claim 5 which is used in combination with a brake rotor of titanium or titanium alloy.

7. A copper series sintered friction material as claimed in claim 1, wherein said at least one additive element is Zn, present in an amount of 5 to 30%.

8. A copper series sintered friction material as claimed in claim 1, wherein said at least one additive element is Ni, present in an amount of 5 to 30%.

9. A copper series sintered friction material as claimed in claim 1, wherein said at least one additive element is Al.

10. A copper series sintered friction material as claimed in claim 1, wherein said at least one additive element is Fe.

11. A copper series sintered friction material as claimed in claim 1, wherein said at least one additive element is Mo.

12. A copper series sintered friction material as claimed in claim 9, wherein Al is present in an amount of 1 to 3%.

13. A copper series sintered friction material as claimed in claim 10, wherein Fe is present in an amount of 1 to 5%.

14. A copper series sintered friction material as claimed in claim 11, wherein Mo is present in an amount of 1 to 5%.

15. A copper series sintered friction material comprising a foundation constituted by copper alloy powder and containing hard phases and solid lubricant components dispersed uniformly, and exhibits a friction coefficient of 0.3 or more stably without seizure when said sintered friction material fictionally slides against titanium or a titanium alloy in the atmosphere, said foundation containing at least one additive element selected from Al, Fe and Mo.

* * * * *